Dec. 13, 1960  W. B. WESTCOTT, JR  2,963,853
LIQUID CYCLE HEAT ENGINE
Filed Aug. 11, 1958  3 Sheets-Sheet 1

INVENTOR.
WILLIAM B. WESTCOTT, JR.
BY
ATTORNEY

Dec. 13, 1960 W. B. WESTCOTT, JR 2,963,853
LIQUID CYCLE HEAT ENGINE
Filed Aug. 11, 1958 3 Sheets-Sheet 2
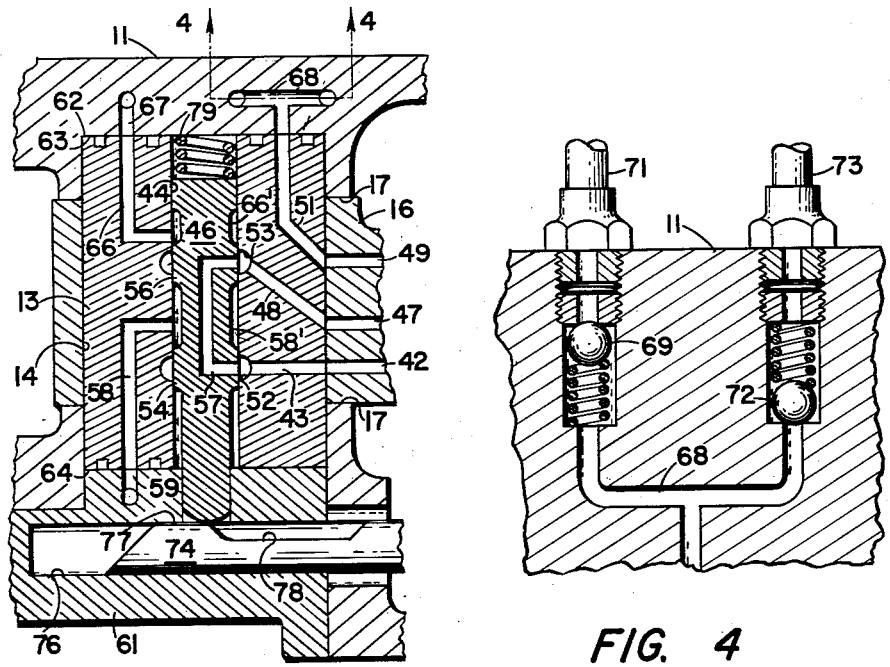
FIG. 3
FIG. 4
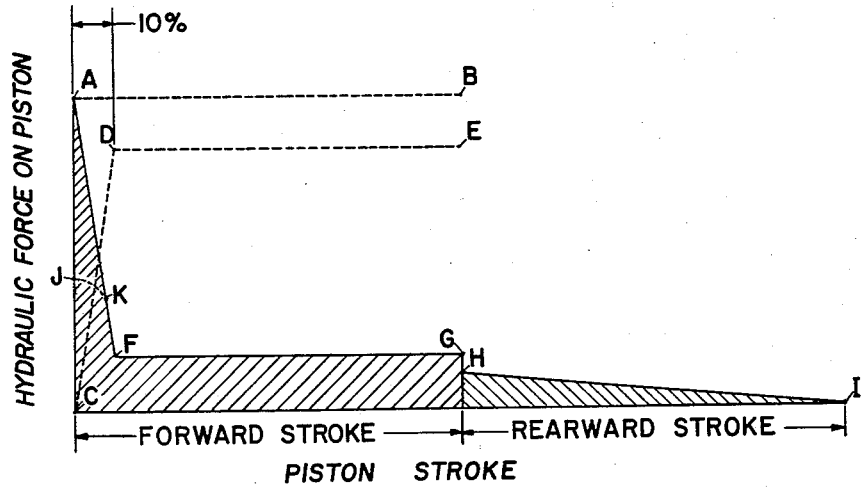
FIG. 7
INVENTOR.
WILLIAM B. WESTCOTT, JR.
BY
ATTORNEY

INVENTOR.
WILLIAM B. WESTCOTT, JR.
BY
ATTORNEY

United States Patent Office 2,963,853
Patented Dec. 13, 1960

2,963,853
LIQUID CYCLE HEAT ENGINE

William B. Westcott, Jr., Cleveland Heights, Ohio, assignor to Cleveland Pneumatic Industries, Inc., Cleveland, Ohio, a corporation of Ohio Filed Aug. 11, 1958, Ser. No. 754,394

12 Claims. (Cl. 60—23)

This invention relates generally to engines and more particularly to a new and improved engine which operates on the compression and expansion of a fluid maintained in the liquid state throughout the operating cycle of the engine and is an improvement of the invention of my co-pending application, Serial No. 728,307 filed April 14, 1958.

In the past, engines have operated by utilizing the expansion of a heated fluid in the gaseous state working against a movable surface to produce mechanical energy. This is true in steam engines and turbines, internal combustion engines of all types, and thermal engines of the hot air type. Because gases are highly compressible, relatively high temperatures must be utilized in gas engines to develop adequate pressure and since the pressures developed in gas engines are relatively low, large engines must be used to develop significant amounts of power. An engine according to this invention utilizes a working fluid in the liquid state at relatively high pressures. Since the pressure level in this engine is very high when compared to gas engines, a small structure can be used to produce large amounts of power and large torques. All of these advantages, and the benefits derived therefrom, are present in the engine of my co-pending application mentioned above. But still further advantages are achieved in the engine according to this invention since bearing loads are substantially reduced and more uniform power stroking is achieved with a simplified structure.

It is an important object of this invention to provide a liquid cycle heat engine capable of producing power on every stroke of operation.

It is another important object of this invention to provide a liquid cycle heat engine wherein the work of compression is transmitted within the piston and cylinder structure and is not transmitted through the crankshaft.

It is still another object of this invention to provide a liquid cycle heat engine having a compound piston and cylinder structure operable to transmit the work of compression without delivering it to the crankshaft of the engine.

It is still another object of this invention to provide an engine structure wherein the bearing loads on the engine are reduced to improve the mechanical efficiency and make possible the use of small mechanical structures.

It is still another object of this invention to provide a liquid cycle heat engine having a steady state heat exchanger for transmitting the operating heat energy to the working liquid.

It is still another object of this invention to provide a liquid cycle heat engine capable of producing large amounts of power with relatively small and structually simple mechanisms.

Further objects and advantages will appear from the following description and drawings, wherein:

Figure 3 is an enlarged fragmentary section of the engine valve structure;

Figure 4 is an enlarged fragmentary section taken along 4—4 of Figure 3;

Figure 1:
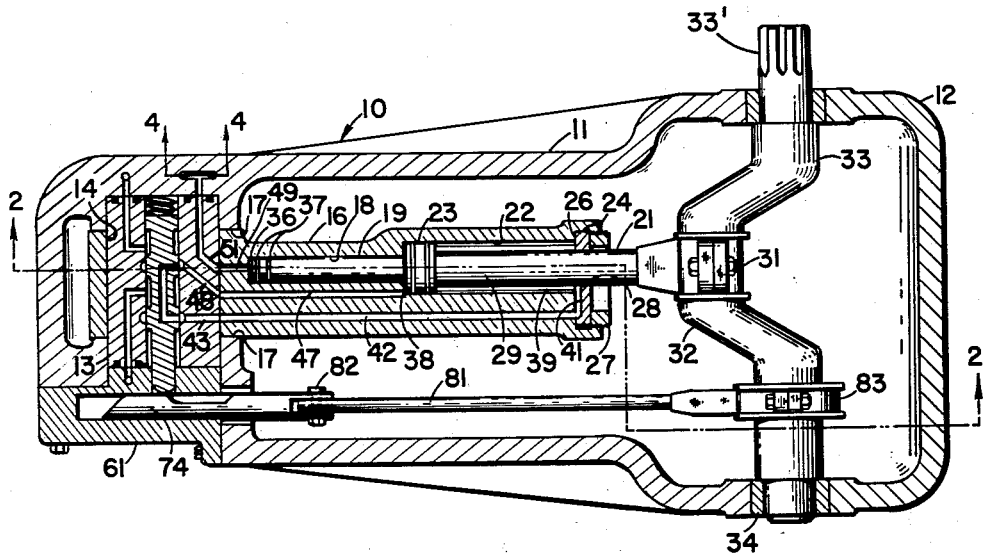
Figure 1 is a plan view in longitudinal section showing the structural details of the engine proper.

In an engine according to this invention, a liquid cycle is utilized in which heated, compressed liquid is expanded against a working surface to produce mechanical power. The liquid itself is first compressed, then heated to increase its volume after which it is expanded against a working surface removing some of the heat energy therefrom and thereafter cooled to its initial condition. A compound piston and cylinder structure is utilized so that power will be delivered on each stroke of the piston eliminating the need of large fly wheels and the like to store the power of compression. Also, the frictional loads are reduced in the engine by arranging the structure so that the power of compression is transmitted directly from one portion of the piston to another.

Referring to the drawings, the engine proper includes a housing assembly 10 comprising a main housing 11 and a crankcase 12. Fixed in the housing assembly 10 against movement relative thereto is a cylinder pivot pin 13 which projects through a bore 14 formed in the head of a cylinder 16. A pair of opposed faces 17 formed on the main housing 11 engage opposite sides of the head of the cylinder 16 and prevent axial movement of the cylinder 16 along the pivot pin 13 and co-operate therewith to mount the cylinder 16 within the housing assembly 10 in a manner wherein it is restrained against all movement excepting pivotal movement around the axis of the pivot pin 13. The cylinder 16 is formed with a forward bore 18 in which a compression portion 19 of a piston 21 reciprocates and a larger diameter rearward bore 22 in which a piston head 23 on the piston 21 reciprocates. A gland 24 is positioned in the outer end of the cylinder 16 and is secured against a shoulder 26 in the cylinder 16 by a gland nut 27. The gland 24 is formed with a bore 28 co-axial with the bore 22 which closely fits and provides sealing engagement with a rearward portion 29 of the piston 21. The outer end of the piston 21 is provided with a journal bearing 31 which connects to an eccentric crank 32 of a crankshaft 33 journalled for rotation in the housing assembly 10 within co-axial bearings 34. Therefore, when the piston 21 reciprocates within the cylinder 16, the crankshaft 33 rotates about its axis and operates to deliver power to a load usually connected at its output end 33', while the cylinder 16 pivots back and forth on the pivot pin 13.

Figure 2:
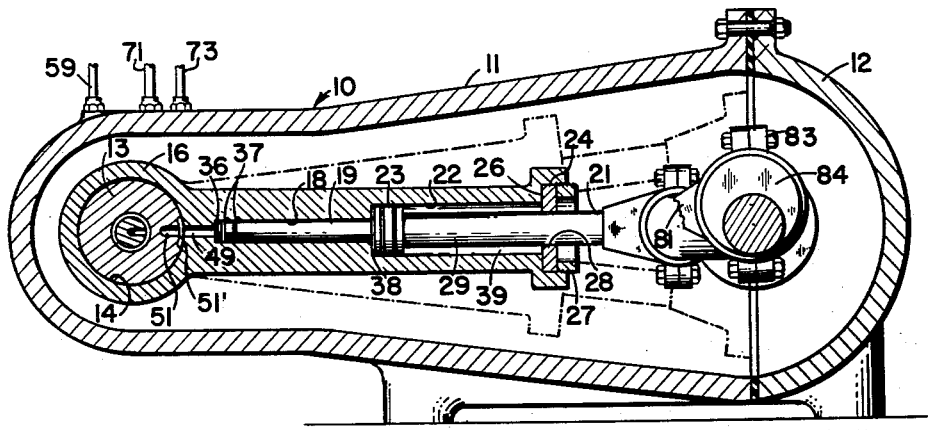
Figure 2 is a side elevation taken along 2—2 of Figure 1.

The forward bore 18 in the cylinder 16 co-operates with the compression portion 19 of the piston 21 to define a variable volume compression chamber 36 above the piston 21 which, in Figures 1 and 2, has substantially zero volume. Of course, as the piston 21 moves to the right, the volume of the compression chamber 36 increases until it reaches a maximum volume and the piston 21 is at the bottom end position. Seals 37 are mounted on the compression portion 19 to provide sealing engagement between the compression portion 19 and the forward bore 18. The piston head 23 within the rearward bore 22 divides it into two variable volume chambers, the first of which is an expansion chamber 38 to the left of the piston head 23, and the second of which is a power chamber 39 to the right of the piston head 23, When the piston 21 is in the top end position of Figures 1 and 2, the volume of the expansion chamber 38 is substantially zero and the volume of the power chamber 39 is at its maximum. However, movement of the piston 21 to the bottom end position increases the volume of the expansion chamber 38 to a maximum and decreases the volume of the power chamber 39 to a minimum.

The cylinder 16 is mounted for pivotal movement around the pivot pin 13 so it is desirable to bring the hydraulic connections from the three chambers 36, 38, and 39 through swivel type connections at the pivot pin 13. The power chamber 39 is open to a radial groove 41 formed in the gland 24 which in turn connects to a longitudinal passage 42 which communicates with a radial passage 43 formed in the pivot pin 13; see Figures 1 and 3. The pivot pin 13 is formed with an axial valve bore 44 in which is positioned a spool valve 46 which operates to control the flow of fluid through the radial passage 43. The cylinder 16 is also formed with a second axial passage 47 open at one end to the upper end of the expansion chamber 38 and at the other end to an inclined passage 48 in the pivot pin 13. Still a third axial passage 49 in the cylinder 16 connects the upper end of the compression chamber 36 with an inclined passage 51 in the pivot pin 13. Thus, the three chambers 36, 38, and 39 are all connected to associated passages 51, 48, and 43 respectively formed in the pivot pin 13. The openings of the passages 43, 48, and 51 at the surface of the pivot pin 13 should be enlarged by a groove such as 51' shown in Figure 2 so that fluid communication will be maintained during the pivotal movement of the cylinder 16 around the pivot pin 13 as shown by the phantom views of Figure 2.

Referring to Figure 3, the radial passage 43 opens to an annular groove 52 in the valve bore 44 and the inclined passage 48 opens to a second annular groove 53 in the valve bore 44. The spool valve 46 is formed with a first land 54 and a second land 56 each in registry with the associated annular grooves 52 and 53 respectively when the valve is in the position shown. The spool valve 46 is also formed with a fluid passage 57 which connects the annular groove 52 to the annular groove 53 when the spool valve 46 is in the position shown and which moves out of registry with the two annular grooves when the spool valve 46 moves downwardly. The pivot pin 13 is also formed with a high pressure passage 58 open at one end to an annular groove 58' formed on the valve 46 and at the other end in registry with a passage 59 leading to an external heat exchanger described below. A valve block 61, through which the passage 59 extends, is bolted to the main housing 11 and axially positions the pivot pin 13 so that one of its end faces 62 is seated against an end wall 63 in the main housing 11 and the other end face 64 of the pivot pin 13 is positioned against the valve block 61. Still another passage 66 is formed in the pivot pin 13 which is in communication with an annular groove 66' formed on the valve 46 and with a passage 67 in the main housing 11. When the spool valve 46 is in the position shown, both of the passages 58 and 66 are isolated from each other and from all the other passages. However, when the spool valve 46 is moved downwardly from the position shown in Figure 3, the passage 58 through the annular groove 58' is brought into communication with the radial passage 43 and in turn with the power chamber 39 through the passages 42 and 41. Simultaneously, the passage 66 is connected through the annular groove 66' to the inclined passage 48 and in turn the expansion chamber 38 through the passage 47. Therefore, the spool valve 46 is adapted to connect the power chamber 39 to the expansion chamber 38 when it is in the Figure 3 position but is movable, by operating means to be described below, to a position wherein the power chamber 39 is connected to the passage 59 and the expansion chamber 38 is connected to the passage 67.

The passages 59 and 67 are in turn connected to the external heat exchanger circuit as will be described below.

The inclined passage 51 is connected through the end face 62 to a dual passage 68 formed in the main housing 11; therefore, the dual passage 68 is always in communication with the compression chamber 36. As shown in Figure 4, one branch of the dual passage 68 connects through a first check valve 69 to an external pressure line 71 and the other branch connects through a second check valve 72 to a second pressure line 73. These two pressure lines 71 and 73 in turn connect the remote heat exchangers as will be discussed in detail below.

To operate the spool valve 46, a reciprocating cam member 74 shown in Figures 1 and 3 is used. The cam member 74 is slidable in a bore 76 formed in the valve block 61 and is formed with a raised portion 77 adapted to engage the end of the spool valve 46 and operates to shift the valve to the position shown in Figure 3 when the raised portion 77 is under the end of the spool valve 46. The cam member 74 is also formed with a low portion 78 adapted to move under the end of the spool valve 46 and permits the valve to shift downwardly from the position shown under the influence of a spring 79, which spring is located between the upper end of the valve and the end wall 63.

In order to reciprocate the cam member 74, a connecting rod 81 is pivotally connected to the cam member 74 by a pivot pin 82 and provided with a bearing journal 83 connecting it to an eccentric cam 84 formed on the crankshaft 33. The cam 84 extends at right angles to the eccentric crank 32 so that the cam member 74 is 90° out of phase with the piston 21. Thus, as the crankshaft 33 rotates by virtue of the reciprocatory movement of the piston 21, the cam member 74 reciprocates by virtue of the rotation of the eccentric cam 84, thus resulting in the reciprocatory movement of the valve 46. However, the cam member 74 moves to shift the spool valve 46 as the piston 21 moves through the dead center positions. It should be noted that the valve in this engine is operated through a complete cycle each time the crankshaft 33 rotates through a complete cycle and that no timing gears are necessary.

Figure 5:
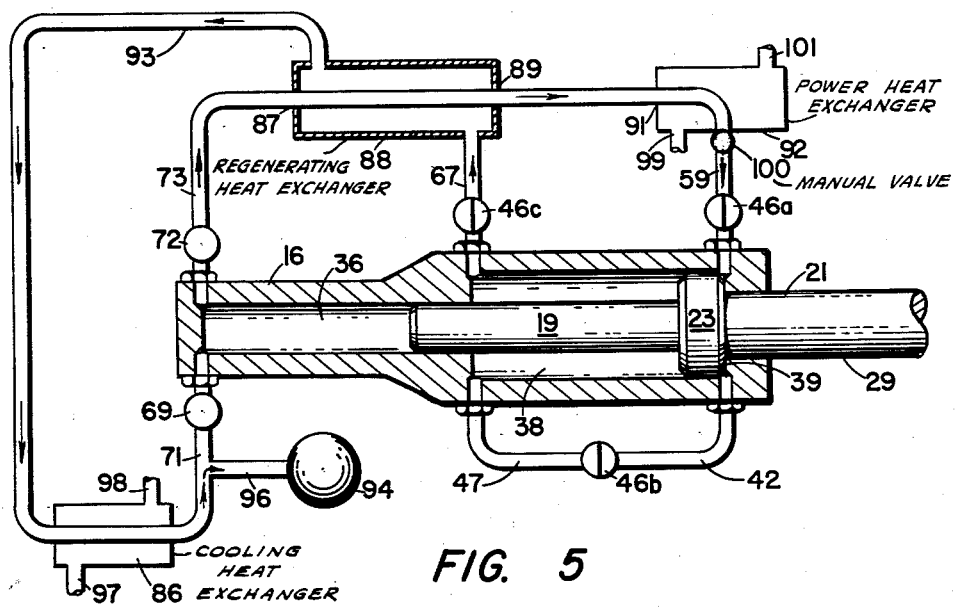
Figure 5 is a schematic view of the entire engine system showing the piston at the bottom end of its stroke.
Figure 6:
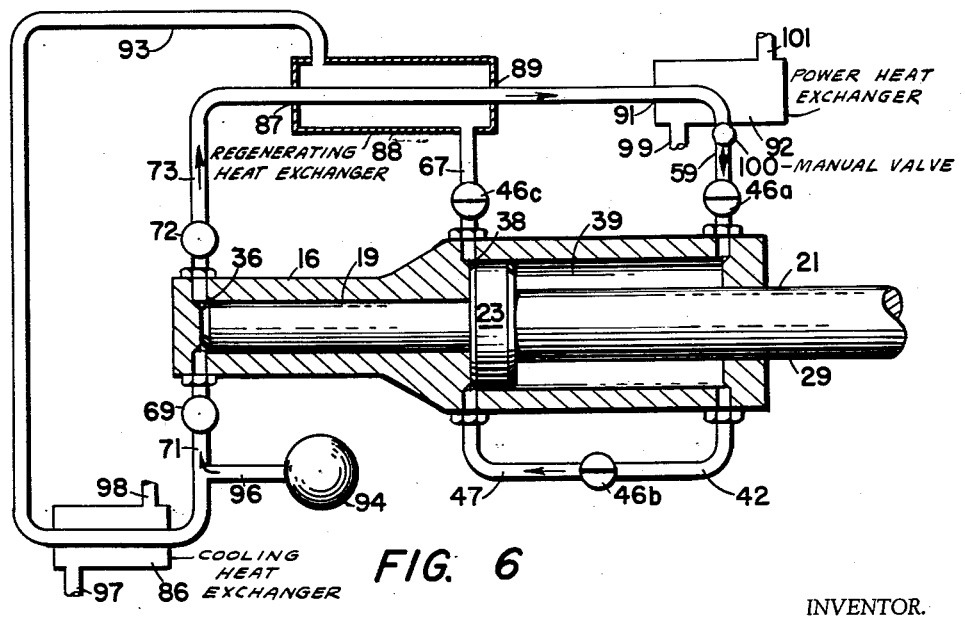
Figure 6 is a view similar to Figure 5 showing the piston at the top end of its stroke; and, Figure 7 is a diagram of the hydraulic forces on the piston plotted against piston stroke through one complete cycle of the engine.

Reference should now be made to Figures 5 and 6 wherein the entire engine system is schematically shown. Similar numerals will be used in the schematic illustration to designate similar elements of the system previously described in connection with Figures 1 through 4. Because the spool valve 46, shown in Figure 3, performs three separate valving functions, this valve is illustrated schematically as a first valve 46a which represents the annular groove portion 58' of the spool valve 46 operable to connect the passage 59 with the power chamber 39, a second valve 46b which represents the fluid passage 57 portion of the spool valve 46 operable to connect the power chamber 39 to the expansion chamber 38, and a third valve 46c which represents the annular groove portion 66' of the spool valve 46 operable to connect the expansion chamber 38 to the passage 67. In the schematic illustrations, the valves 46a, 46b, and 46c can be considered individually and are represented as closed when a dash crosses the valve perpendicular to the connecting conduits and opened when the dash is aligned with the connecting conduits. Thus, when the spool valve 46 is shifted downwardly from the position shown in Figure 3, which is the condition schematically shown in Figure 5, the valves 46a and 46c are open and the valve 46b is closed. When the spool valve 46 is shifted to the position shown in Figure 3, which is the condition schematically shown in Figure 6, the valves 46a and 46c are closed and the valve 46b is open.

There are three heat exchangers which connect to the engine proper and co-operate therewith to form the engine system; namely, a cooling heat exchanger 86, a regenerating heat exchanger 88, and a power heat exchanger 92. The compression chamber 36 is connected to the inlet side of the cooling heat exchanger 86 through the check valve 69 and the pressure line 71 and also to the inlet side 87 of the regenerating heat exchanger 88 through the check valve 72 and the pressure line 73. The outlet side 89 of the regenerating heat exchanger 88 is in turn connected to an inlet 91 of the power heat exchanger 92 which in turn connects to the power chamber 39 through the passage 59 and the valve 46a.

The passage 67 is connected to the regenerating heat exchanger 88, so that liquid expelled from the expansion chamber 38 flows through the regenerating heat exchanger 88 from which it flows through a conduit 93 to the cooling heat exchanger 86.

The engine is started by applying heat to the power heat exchanger 92 to cause the pressure therein to build up. When sufficient pressure is present in the high pressure circuit due to the heating, the engine is mechanically moved to a position within an in or compression stroke and the engine begins to operate. However, if the leakage rate of the valve 46 and piston seals relative to the rate of initial heating is such that pressure will not build up upon heating, it is merely necessary to provide a manual valve 100 in the passage 59 which is closed until sufficient pressure builds up to start the engine. This valve is then opened while the engine is on an in or compression stroke or while the engine is being mechanically cranked.

When the engine reaches a steady state operating condition, the pressure of the liquid within the pressure line 73 is maintained at a high pressure in the order of 20,000 pounds per square inch or more and the pressure of the liquid within the conduit 93 is maintained at a relatively low pressure which could be atmospheric pressure if desired. However, if a closed cycle is to be used in the low pressure portion and cooling heat exchanger 86, an accumulator 94 is preferably connected to the low pressure portion. In the illustrated case, the accumulator 94 is connected to the pressure line 71 through a line 96. Therefore, when the volume of the liquid contained in the low pressure portion of the engine system changes, as will be described below, the accumulator 94 operates to prevent excessive variations in pressure.

All three of the chambers 36, 38, and 39 are always filled with liquid so when the piston 21 moves from its bottom end position shown in Figure 5 to the left, liquid already contained with the compression chamber 36 is compressed during substantially the first 10% of the stroke to the pressure within the pressure line 73. At that time, the pressure within the compression chamber 36 reaches the pressure of the pressure line 73, and check valve 72 opens to permit flow out of the compression chamber 36 into the pressure line 73. The valve 46a is mechanically opened by the cam member 74 at the beginning of the stroke to the left so the high pressure line 73 is also connected to the power chamber 39. Therefore, liquid at substantially 20,000 pounds per square inch acts on the right-hand side of the piston head 23 to produce a force urging the piston 21 to the left and supplies power to compress the liquid within the compression chamber 36.

From the foregoing, it will be understood that the end of the piston portion 19 within the chamber 36 and the right side of the piston head 23 within the chamber 39 constitute opposite sides of a first differential area piston means, effecting the compression of the liquid by exposing the liquid to the relative small area of the end of the piston portion 19 and applying power to the piston by subjecting the compressed liquid to the larger effective area of the piston head 23 within the chamber 39.

In the description that follows, illustrative pressures and temperatures are given throughout the system but it should be understood that they are merely given as an example and are not to be considered limiting. Assuming that the temperature of the liquid within the compression chamber 36 is approximately 70° F. prior to its compression, as it is adiabatically compressed within the chamber 36 to substantially 20,000 pounds per square inch, its temperature will rise to approximately 110° F., a temperature at which it will remain as it flows through the pressure line 73 leading to the regenerating heat exchanger 88. This heat exchanger 88 is proportioned, constructed, and arranged in a manner capable of increasing the temperature of the compressed liquid flowing therethrough to substantially 300° F. Because such heat exchangers can be of any suitable type and are well-known in the art, no detailed description thereof is thought necessary. From the regenerating heat exchanger 88, compressed liquid flows through a second heat exchanger 92, which is of a type and capacity capable of raising the temperature of the compressed liquid from 300° F. to substantially 450° F.

The temperature increase from substantially 110° F. when the liquid flows out of the compression chamber 36 to approximately 450° F. when it enters the power chamber 39, causes the liquid to expand so that a given mass of liquid has a larger volume when it enters the power chamber 39 than it has as it is pumped out of the compression chamber 36. The various proportions of the engine are arranged so that in a given inward stroke of the piston 21, the same mass of liquid is pumped into the pressure line 73 as it flows out into the power chamber 39. If it is assumed that the liquid is expanded by 20% as it is heated, the right side of the piston head 23 is arranged to have an area 20% greater than the area of the compression portion 19. Since 20,000 pounds per square inch is acting on the piston head 23 and on the compression portion 19, the net forces on the piston 21 will be equal to the differential area between the right side of the piston head 23 and the compression portion 19. Therefore, a resulting force is created on the piston 21 which is equal to the difference in area between the right side of the piston head 23 and the compression portion 19 times the pressure which, in the illustrated case, is 20,000 pounds per square inch and the work of compression is transmitted directly along the piston. The resulting force, of course, operates to move the piston 21 to the left toward the top dead center position of Figure 6 and will produce torque to rotate the crankshaft 33.

During the movement of the piston 21 to the left, liquid at low pressure within the expansion chamber 38 is pumped out through the valve 46c to the regenerating heat exchanger 88 and on to the cooling heat exchanger 86. When the piston 21 is in the top dead center position, the cam member shifts the spool valve 46 to close the valves 46a and 46c and open the valve 46b. At this time, the power chamber 39 is completely filled with liquid at high pressure in the order of 20,000 pounds per square inch. Since the valve 46b is open at this time, the liquid under pressure flows through the passages 42 and 47 to act on the opposite sides of a second differential area piston means, that is, on both sides of the piston head 23. The various proportions are arranged so that the compression portion 19 has a smaller area than the rearward portion 29 so the left side of the piston head 23 has a larger area than the right side. Therefore, a net force will be produced on the piston head 23 urging it to the right which force is equal to the difference in area between the left side of the piston head 23 and the right side of the piston head 23 times the pressure of the liquid acting on the piston head 23. Because the compression portion 19 of the piston 21 has a smaller area than the rearward portion 29, the volume of the expansion chamber 38, when the piston 21 reaches its bottom dead center position, is greater than the volume of the power chamber 39 when the piston 21 is in its top dead center position. Therefore, movement of the piston 21 to the right from the position of Figure 6 back to the position of Figure 5, results in an expansion of the liquid acting on the piston head 23 and produces a torque operating to rotate the crankshaft 33 on the outward stroke.

Since the check valve 72 prevents flow of liquid from the pressure line 73 back into the compression chamber 36, movement of the piston 21 to the right reduces the pressure in the compression chamber 36 until the check valve 69 opens and liquid flows into the compression chamber 36 from the cooling heat exchanger 86. Therefore, when the piston 21 reaches its bottom dead center position of Figure 5, the compression chamber 36 is completely filled with liquid at low pressure and relatively low temperature.

The expansion of the liquid from the power chamber 39 to the expansion chamber 38 reduces its pressure and in turn reduces its temperature adiabatically so that the liquid within the expansion chamber 38 is at relatively low pressure and at a temperature of about 400° F. As it is pumped out of the expansion chamber 38 at low pressure, the liquid enters the regenerating heat exchanger 88 at about 400° F. and is cooled therein to about 200° F. In this way, a large part of the heat energy of the exhaust liquid from the engine is used to heat the high pressure liquid in the pressure line 73 flowing through the regenerating heat exchanger 88 and results in substantial improvements in the over-all engine efficiency. As the liquid enters the cooling heat exchanger 86 at substantially 200° F., its temperature is further reduced as it flows through the exchanger to substantially its original temperature of 70° F.

Any suitable source of cooling, such as cool water or the like, can be passed through the inlet 97 and outlet 98 of the cooling heat exchanger 86 to provide the cooling necessary. Also, any suitable source of heat can be used to heat the liquid passing through the heat exchanger 92 to provide the power for operating the engine. Because the temperature of the liquid flowing out of the heat exchanger 92 is relatively low when compared to other powering fluids, it is possible to use exhaust gases from other engines or waste heat from other processes to supply the heat energy for the heat exchanger 92. If exhaust gases from other engines are to be used, they would pass through the inlet 99 and outlet 101 of the heat exchanger 92. It should be recognized that in Figures 5 and 6, the heat exchangers are schematically shown and that they are physically larger in an operating engine to provide sufficient heat exchanging capacity. It should also be recognized that the regenerating heat exchanger 88 and the heat exchanger 92 have to be capable of withstanding the high pressures occurring in the system.

The volume of the high pressure circuit should be many times as great as the volume of liquid displaced from the compression chamber 36 in a given stroke so that during each stroke, a slug or mass of liquid is moved into the high pressure circuit and progressively displaces an equal mass therefrom. This insures that the pressure will not fluctuate substantially in the high pressure circuit since some liquid flows out of the high pressure circuit into the power chamber 39 before the liquid within the compression chamber 36 is compressed to a pressure which will operate to open the check valve 72. In addition, by providing the high pressure circuit with a larger volume, it is possible to easily transfer sufficient energy to the liquid as it flows therethrough.

To stop the engine, it is merely necessary to shut off the heat supply to the power heat exchanger 92. However, if the response time of this heat exchanger is not as fast as desired, the manual valve 100 in the passage 59, as discussed above in connection with the engine starting, can be closed to stop the engine.

Referring to Figure 7, the hydraulic forces acting on the piston are plotted through one complete cycle which includes forward and backward strokes. If it is considered that the cycle begins when the piston 21 is in the bottom end position, the force acting on the right side of the piston head 23 can be illustrated by the dotted line from A to B. This force acts to move the piston 21 to the left from the bottom dead center position. Initially, the liquid within the compression chamber 36 is at low pressure but is compressed to the high pressure when the piston has moved through 10% of its stroke, so the force of the liquid acting on the compression portion 19 during the compression can be illustrated by the dotted line from C to D. After the liquid within the compression chamber 36 is at a pressure equal to the pressure in the high pressure circuit for the remaining 90% of the stroke, a force is produced on the high compression portion 19 of the piston which can be represented by the dotted line from D to E. Since these two forces act on the piston in opposite directions, the forces represented by the line CDE must be subtracted from the forces represented by the line AB and result in net power represented by the line AGF. The work produced on this stroke is a function of the shaded area under the curve AFG. At the completion of the inward stroke when the piston 21 is at the top dead center position, the spool valve 46 is shifted to the position shown in Figure 3 and the pressure acts on the two sides of the piston head 23. This produces a net force on the piston head 23 which is a function of the difference in areas of the two sides thereof and causes the piston 21 to move back toward the bottom dead center position. The force of the liquid acting on the piston head 23 during this stroke decreases as the pressure drops due to the expansion of the liquid and its net force can be represented by the line HI, and the work delivered from the liquid can be represented by the shaded area below the line HI. The point H is below the point G because the liquid in the illustrated case expands less due to decompression than it does due to heating. Therefore, the left side of the piston head 23 is larger than the right side by a smaller ratio than the right side of the piston head 23 is larger than the compression portion 19. It should be noted that power is delivered to the crankshaft 33 on both the inward and outward strokes of the engine so a single cylinder engine is capable of producing continuous power.

To prevent extremely high forces from being delivered to the crankshaft 33, it is desirable to arrange the spool valve 46 so that it does not fully open at the beginning of the forward stroke and therefore does not initially apply the full pressure from the high pressure circuit against the right side of the piston head 23. Those skilled in the art of valve design will recognize that this simplifies the valve manufacture because normally, valves do not snap to the fully open position and there will be a pressure drop as the valve starts to open. In this case, it is desirable to design the valve so that it is not fully open to unrestricted flow until the piston 21 approaches a 10% displacement. If this is done, there is some metering through the valve into the power chamber 39 so that the peak at A is removed and the net force on the piston 21 initially follows the curve between J and K. It is true that a small amount of available power is lost by arranging the engine in this manner but in so doing, it is possible to eliminate the extremely high peak load on the crankshaft 33 and therefore make the crankshaft substantially smaller for a given engine rating.

Because high pressures are utilized in the engine according to this invention, relatively small pistons and cylinders are capable of producing large horsepower. In gas engines in the past, it has been difficult to obtain horsepower ratings above one horsepower per cubic inch of displacement. However, by utilizing an engine according to this invention, it is possible to obtain in the order of forty or more horsepower per cubic inch of displacement. In addition, it is possible to arrange the engine so that sufficient heat exchanging area is available to provide adequate heat transfer by merely making the heat exchangers 88 and 92 of the size necessary to obtain the desired heat transfer.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A hydraulic engine comprising cylinder and piston members movable relative to each other and co-operating to define separate compression, power and expansion chambers; the volumes of said compression and expansion chambers being increased by movement between said members in one direction and the volume of said power chamber being increased by movement between said members in a direction opposite said one direction, liquid filling said chambers, a heater filled with compressed liquid and adding heat thereto, valved means connecting said power and expansion chambers and connecting said compression chamber with a source of liquid when said members are moving in said one direction and connecting said compression and power chambers through said heater and connecting said expansion chamber to exhaust when said members are moving in said opposite direction whereby compressed liquid from said heater enters said power chamber and compresses liquid from said compression chamber into said heater, an output element driven by relative movement between said members and means controlling said valved means driven by said output element.

2. A hydraulic engine comprising cylinder and piston members movable relative to each other and co-operating to define separate variable volume compression, power and expansion chambers; the volumes of said compression and expansion chambers being increased by movement between said members in one direction and the volume of said power chamber being increased by movement between said members in a direction opposite said one direction, liquid cooling and heating means for said engine, said heating means compirsing an inlet and an outlet connected by a passageway, a system of conduits between said liquid heating and cooling means and said chambers, liquid filling said chambers, heating and cooling means and said system of conduits, valve means operated by relative movement between said members automatically connecting said power chamber to said expansion chamber and admitting cool liquid from said liquid cooling means to said compression chamber when said members are moving in said one direction, said valve means connecting said compression chamber with the inlet of said liquid heating means and the outlet of said liquid heating means with said work chamber when said members are moving in the opposite direction, and an output element connected to be driven by relative movement between said members.

3. A hydraulic engine comprising cylinder and piston members movable relative to each other and co-operating to define separate variable volume compression, power and expansion chambers; the volumes of said compression and expansion chambers being increased by movement between said members in one direction and the volume of said power chamber being increased by movement between said members in a direction opposite said one direction, liquid cooling and heating means for said engine, a system of conduits between said liquid heating and cooling means and said chambers, liquid filling said chambers, heating and cooling means and said system of conduits, valve means operated by relative movement between said members automatically connecting said power chamber to said expansion chamber and admitting cool liquid from said liquid cooling means to said compression chamber when said members are moving in said one direction and enabling liquid flow from said compression chamber through said liquid heating means into said work chamber when said members are moving in the opposite direction, the maximum volume of said power chamber being larger than the maximum volume of said compression chamber and the maximum volume of said expansion chamber being larger than the maximum volume of said power chamber, and an output element connected to be driven by relative movement between said members.

4. A hydraulic engine comprising cylinder and piston members movable relative to each other and co-operating to define separate variable volume compression, power and expansion chambers; the volumes of said compression and expansion chambers being increased by movement between said members in one direction and the volume of said power chamber being increased by movement between said members in a direction opposite said one direction, liquid heating means for said engine, liquid filling said chambers and heating means, valved means connecting said power and expansion chambers and admitting liquid to said compression chamber when said members are moving in said one direction and connecting said compression and power chambers for flow to the latter through said heating means when said members are moving in said opposite direction, a connection between said expansion chamber and heating means delivering expanded liquid therefrom, said heating means operating to transfer heat energy of liquid from said expansion chamber to liquid flowing to said power chamber, said heating means including means for adding additional heat to liquid flowing to said power chamber, an output element connected to be driven by relative movement of said members and means for operating said valved means driven by said output element.

5. A hydraulic engine comprising compressing means operable to compress a liquid under the influence of energy supplied thereto, heat exchanger means connected to said compressing means adding heat from an external source of heat energy to liquid compressed thereby while maintaining the pressure thereof substantially constant, motor means connected to said heat exchanger means operating to convert a portion of the energy of the heated compressed liquid therefrom into mechanical work without substantially reducing the pressure of said liquid, a connection between said motor means and said compressor means transmitting energy from said motor means to said compressor means for the operation thereof, and expansion means connected to said motor means operating to expand heated compressed liquid therefrom removing energy from said liquid and reducing the pressure thereof, said heat exchanger means being connected to said expansion means and operating to remove heat energy from the expanded liquid for heating said compressed liquid, valve means controlling said connection between said compressing means and said heat exchanger means, between said motor means and said heat exchanger means, between said expansion means and said heat exchanger means, and between said expansion means and said motor means, an output element connected to be driven by said motor means and said expansion means, and means for controlling said valve means driven by said output element.

6. A hydraulic engine comprising a cylinder, a compound piston movable in said cylinder co-operating therewith to define a compression chamber, a power chamber and an expansion chamber, the volumes of which are changed by piston movement, the volume of said compression and expansion chambers being reduced and the volume of said power chamber being increased by relative movement between said cylinder and piston in one direction, a liquid reservoir, a heat exchanger having an inlet and an outlet adding heat to liquid contained therein, liquid filling said chambers, heat exchanger and reservoir, first valved means controlled by relative movement between said piston and cylinder connecting said compression chamber to said reservoir when said cylinder and piston are moving relative to each other in a direction opposite said one direction and connecting said compression chamber to said heat exchanger inlet when said cylinder and piston are moving relative to each other in said one direction, and second valved means controlled by movement of said piston connecting said power chamber to said heat exchanger outlet and said expansion chamber to said reservoir when said cylinder and piston are moving relative to each other in said one direction and connecting said power chamber to said expansion chamber when said cylinder and piston are moving relative to each other in said opposite direction.

7. In an engine, an output member, relatively movable members forming expansible chamber means connected to move said output member, a heater having an inlet and an outlet, a source of liquid, a valved intake passageway connecting said source of liquid with said chamber means, a valved compression passageway connecting said chamber means with the inlet of said heater, a valved power passageway connecting the outlet of said heater with said chamber means, and a valved exhaust passageway connected to said chamber means, said exhaust passageway having a portion in heat exchange relation with said compression passageway, valve operating means opening and closing certain of said valved passageways and connected to be moved in timed relation to the movement of said output member, and said relatively movable members and said valve operating means being movable through a cycle comprising periods of withdrawing liquid from said source, compressing such liquid into the inlet of said heater, withdrawing heated compressed liquid from the outlet of said heater, expanding such liquid to a lower pressure, and discharging the expanded liquid through said exhaust passageway.

8. In an engine, an output member, movable means forming two separate expansible chambers, said means being movable through a cycle including periods of expansion and of contraction of each of said chambers, said means being connected to move said output member, a heater filled with heated compressed liquid, a passageway connecting said heater with one of said chambers, an exhaust passageway to the other of said chambers and a passageway connecting said two chambers together, valve means for opening and closing said passageways, said valve means being connected to said output member for operation in timed relation to the movement thereof, said valve means being timed to open said heater to said one chamber during an expanding period thereof, thereafter to isolate said heater from said one chamber and to connect said two chambers together during a contracting period of said one chamber and an expanding period of said other chamber and thereafter to open said other chamber to said exhaust passageway during a contracting period of said other chamber, said engine including means for compressing liquid into said heater.

9. In an engine, an output member, movable means forming two separate expansible chambers, said means being movable through a cycle consisting of a period of expansion of the first of said chambers and a simultaneous period of contraction of the second of said chambers followed by simultaneous periods of contraction and expansion of said first and second chambers, respectively, the second of said chambers having a greater displacement volume than the first, said means being connected to move said output member, a heater filled with heated compressed liquid, a passageway connecting said heater with said first chamber, an exhaust passageway connected to said second chamber and a passageway connecting said two chambers together, valve means for opening and closing said passageways, said valve means being connected to said output member for operation in timed relation to the movement thereof, said valve means being timed to open said heater to said first chamber during each expanding period thereof, thereafter to isolate said heater from said chambers and to connect said two chambers together during each contracting period of said first chamber and simultaneous expanding period of said second chamber and to open said second chamber to said exhaust passageway during each contracting period of said second chamber, said engine including means for compressing liquid into said heater.

10. In an engine, an output member, movable means forming three separate expansible chambers and movable through a cycle consisting of one period of expansion and one period of contraction of each of said chambers, said means being connected to move said output member, a source of liquid, a heater filled with heated compressed liquid, the first of said expansible chambers constituting a compressor, valved passageways connecting said first chamber to said source of liquid during each expanding period and to said heater during each contracting period, said second and third chambers constituting a motor, a passageway connecting said heater to said second chamber, an exhaust passageway connected to said third chamber and a passageway connecting said second and third chambers together, valve means controlling said passageways, said valve means being connected to said output member for operation in timed relation to the movement thereof, said valve means being timed to open said heater to said second chamber during each expanding period thereof, to isolate said chambers from said heater and connect said second and third chambers together during each contracting period of said second chamber and expanding period of said third chamber and to connect said third chamber to said exhaust passageway during each contracting period thereof.

11. In an engine, an output member, movable means forming three separate expansible chambers and movable through a cycle consisting of one period of expansion and one period of contraction of each of said chambers, said means being connected to move said output member, a source of liquid, a heater filled with heated compressed liquid, the first of said expansible chambers constituting a compressor, valved passageways connecting said first chamber to said source of liquid during each expanding period and to said heater during each contracting period, whereby said first chamber withdraws liquid from said source and compresses the same into said heater during each cycle of said movable means, said second and third chambers constituting a motor, a passageway connecting said heater to said second chamber, a return passageway connected to said third chamber and a passageway connecting said second and third chambers together, valve means controlling said passageways, said valve means being connected to said output member for operation in timed relation to the movement thereof, said valve means being timed to open said heater to said second chamber during each expanding period thereof, to isolate said second chamber from said heater and connect said second and third chambers together during each contracting period of said second chamber and expanding period of said third chamber and to connect said third chamber to said return passageway during each contracting period thereof, said return passageway being connected to said source of liquid and including a portion in heat exchange relation with said passageway connecting said first chamber with said heater.

12. In an engine, a rotatable crankshaft, a cylinder, a double-acting piston connected to said crankshaft for reciprocation in said cylinder and forming with the ends of said cylinder two separate expansible chambers, the chamber at one end of said cylinder having a smaller displacement volume than that at the other end of said cylinder, a heater filled with heated compressed liquid, a passageway connecting said heater with said one end of said cylinder, an exhaust passageway connected to the other end of said cylinder and a passageway connecting the two ends of said cylinder together, valve means for opening and closing said passageways, said valve means being connected to said crankshaft for operation in timed relation to the movement thereof, said valve means being timed to open said other end of the cylinder to said exhaust passageway and simultaneously to open said heater to said one end of said cylinder to admit heated compressed liquid therein to force said piston toward said other end of said cylinder, thereafter to isolate said heater from said cylinder and to connect the two ends of said cylinder together to allow elastic expansion of said liquid from said one end into said other end of said cylinder to force said piston toward said one end of said cylinder, said engine including means for compressing liquid into said heater.

References Cited in the file of this patent

UNITED STATES PATENTS

| | | |
|---|---|---|
| 226,570 | Thuemmler | Apr. 13, 1880 |
| 1,426,462 | Claude | Aug. 22, 1922 |
| 2,622,565 | Venus | Dec. 23, 1952 |